(12) United States Patent
Kanbara et al.

(10) Patent No.: US 9,945,317 B2
(45) Date of Patent: Apr. 17, 2018

(54) FUEL INJECTION DEVICE

(71) Applicant: DENSO CORPORATION, Kariya, Aichi-pref. (JP)

(72) Inventors: Motoya Kanbara, Nishio (JP); Daiji Ueda, Kariya (JP)

(73) Assignee: DENSO CORPORATION, Kariya (JP)

( * ) Notice: Subject to any disclaimer, the term of this patent is extended or adjusted under 35 U.S.C. 154(b) by 131 days.

(21) Appl. No.: 14/885,175

(22) Filed: Oct. 16, 2015

(65) Prior Publication Data

US 2016/0115896 A1  Apr. 28, 2016

(30) Foreign Application Priority Data

Oct. 27, 2014 (JP) .................. 2014-218133

(51) Int. Cl.
| | |
|---|---|
| F02M 51/00 | (2006.01) |
| F02D 41/40 | (2006.01) |
| F02D 41/20 | (2006.01) |
| F02D 41/24 | (2006.01) |
| F02M 47/02 | (2006.01) |
| F02M 51/06 | (2006.01) |

(52) U.S. Cl.
CPC ....... *F02D 41/403* (2013.01); *F02D 41/2096* (2013.01); *F02D 41/247* (2013.01); *F02D 2041/2024* (2013.01); *F02D 2041/2055* (2013.01); *F02D 2041/2058* (2013.01); *F02M 47/027* (2013.01); *F02M 51/0603* (2013.01); *Y02T 10/44* (2013.01)

(58) Field of Classification Search
CPC .............. F02D 41/2096; F02M 63/0026

USPC ............ 123/472, 478, 480; 701/103
See application file for complete search history.

(56) References Cited

U.S. PATENT DOCUMENTS

| | | | | |
|---|---|---|---|---|
| 4,887,569 A | * | 12/1989 | Igashira | F02D 41/2096 123/300 |
| 6,253,736 B1 | * | 7/2001 | Crofts | F02M 47/027 123/467 |
| 6,276,337 B1 | * | 8/2001 | Minato | F02D 41/20 123/456 |

(Continued)

FOREIGN PATENT DOCUMENTS

| | | |
|---|---|---|
| JP | 2001-241350 | 9/2001 |
| JP | 2005-48750 | 2/2005 |

(Continued)

*Primary Examiner* — Marguerite McMahon
*Assistant Examiner* — Tea Holbrook
(74) *Attorney, Agent, or Firm* — Nixon & Vanderhye P.C.

(57) ABSTRACT

When a main injection is performed, a first timing that is a time earlier than a second timing is selected as the valve opening starting timing, and a first period that is the period of time shorter than a second period is selected as the control period. Also, when a pilot injection is performed, the second timing that is the time later than the first timing is selected as the valve opening starting timing, and the second period that is the time longer than the first period is selected as the control period. Thus, in an injector with increased valve opening responsiveness, the valve opening behavior of a control valve of the injector in fuel injection with a minute injection quantity can be stabilized without replacing a control device, particularly an EDU with that of a large current specification.

10 Claims, 11 Drawing Sheets

(56) References Cited

U.S. PATENT DOCUMENTS

| | | | |
|---|---|---|---|
| 6,499,467 B1* | 12/2002 | Morris | F02M 47/027 123/446 |
| 2001/0023686 A1* | 9/2001 | Okamoto | F02B 31/06 123/490 |
| 2002/0023622 A1* | 2/2002 | Rueger | F02D 41/2096 123/490 |
| 2003/0106533 A1* | 6/2003 | Crofts | F02M 47/027 123/446 |
| 2005/0022793 A1* | 2/2005 | Takemoto | F02D 41/2096 123/480 |
| 2009/0038590 A1* | 2/2009 | Fukushima | F02D 41/2096 123/494 |
| 2011/0061632 A1 | 3/2011 | Fukushima | |
| 2012/0048239 A1* | 3/2012 | Jalal | F02D 41/2096 123/472 |
| 2013/0019842 A1* | 1/2013 | Shaver | F02C 9/26 123/478 |
| 2015/0152830 A1* | 6/2015 | Denk | F02D 41/20 73/114.49 |
| 2015/0369187 A1* | 12/2015 | Leblon | F02D 41/2096 239/5 |
| 2016/0003183 A1* | 1/2016 | Russe | F02D 41/2096 701/103 |
| 2017/0058793 A1* | 3/2017 | Harada | F02M 61/1806 |

FOREIGN PATENT DOCUMENTS

| | | |
|---|---|---|
| JP | 2006-144588 | 6/2006 |
| JP | 3827003 | 9/2006 |
| JP | 2006-348791 | 12/2006 |

* cited by examiner

FUEL INJECTION DEVICE

CROSS REFERENCE TO RELATED APPLICATION

This application is based on Japanese Patent Application No. 2014-218133 filed on Oct. 27, 2014, the disclosure of which is incorporated herein by reference.

TECHICNICAL FIELD

The present disclosure relates to a fuel injection device that controls the fuel injection to cylinders of an internal combustion engine.

BACKGROUND

As a fuel injection device, those including a fuel injector that injects the fuel into the cylinder of the internal combustion engine and a control device that controls the opening/closing motion of the fuel injector are known.

The fuel injector includes a needle that opens/closes an injection hole, a control chamber that applies the fuel pressure for energizing the needle to the valve closing direction, and a control valve that controls communication and cutoff between the control chamber and a high pressure port or a low pressure port. The fuel injector increases/decreases the fuel pressure inside the control chamber by making a high pressure fuel to flow out from and flow in to the control chamber, and controls the opening/closing motion of the needle (refer to Japanese Patent No. 3827003: DE-10306296 A1).

In the fuel injector described above, one in which the aperture diameter of the out orifice used for allowing the fuel to flow out from the control chamber to the low pressure fuel path is expanded and the discharge flow rate is increased in order to improve the valve opening responsiveness has been developed.

As an actuator that drives to open the control valve which switches the valve closing state for closing the low pressure port to the valve opening state for opening the low pressure port, a layered piezoelectric element is used. When the layered piezoelectric element that expands/shrinks by charging/discharging of the electric charge is used, such problem as described below occurs in performing injection of a minute injection quantity such as a pilot injection (hereinafter referred to as a minute injection).

To be more specific, the layered piezoelectric element drives to open the control valve by being charged and extending. Thus, the control chamber and the low pressure port communicate with each other, the fuel is discharged from the control chamber, and thereby the needle opens the valve.

On the other hand, the control device sets the injection command value per one injection of the fuel injector from the target injection quantity and the fuel pressure. This injection command value shows the energization time from start of charging to start of discharging with respect to the layered piezoelectric element.

In order to stabilize (maintain) the valve opening state of the control valve, namely the valve opening state of the fuel injector, in the control device, the final target value with respect to the charging voltage for the layered piezoelectric element is set to a value greater than the valve opening starting value that is the charging voltage of the time when the control valve starts valve opening.

Also, the control device starts charging with respect to the layered piezoelectric element based on the injection command value, and, when the charging voltage reaches the valve opening starting value, the control valve opens. Further, when the fuel pressure within the control chamber lowers than the valve opening pressure, the needle opens the valve, and the fuel injection starts.

Also, the control device makes the charging voltage reach the final target value, thereafter subsequently maintains the charging voltage at the final target value to continue the fuel injection, thereafter starts discharging to close the control valve, and the fuel injection finishes.

Further, in the control device, in order that the charging voltage of the layered piezoelectric element reaches the final target value as quickly as possible, the charging period after the charging is started until the charging voltage reaches the final target value is set short, and the charging current is supplied from the drive circuit to the layered piezoelectric element according to this short charging period.

However, when the valve opening responsiveness is improved and the period until the fuel injector starts opening becomes short, the actual injection quantity increases by that portion compared to that of one with low valve opening responsiveness. Therefore, it is necessary to reset the injection command value short so that the actual injection quantity reduces. Particularly, in the minute injection as described above, there is a case where the injection command value becomes extremely small and becomes less than or equal to the charging period.

In such a case, discharging may possibly start before the charging voltage reaches the final target value. As a result, when discharging starts before the charging voltage reaches the final target value, the valve opening behavior of the control valve possibly becomes unstable.

Also, in a minute injection, with the aim of avoiding such situation that the injection command value becomes less than or equal to the charging period and discharging starts before the charging voltage reaches the final target value, it is possible to set the charging period shorter.

However, when the charging period is made shorter, the energization condition in the drive circuit becomes severe, the drive circuit must be replaced with a large current drive circuit, and therefore the cost may possibly increase.

SUMMARY

It is an object of the present disclosure to provide a fuel injection device having a layered piezoelectric element, which can stabilize a valve opening behavior of a valve body in a small injection quantity without replacing a drive circuit with a large current drive circuit and has an improved valve opening responsiveness.

The fuel injection device of the present disclosure includes a fuel injection quantity determining section, a determining section, and a setting section.

According to this fuel injection device, when the command value of the injection quantity is determined to be greater than a predetermined value, as the valve opening starting timing when the charging amount to the layered piezoelectric element reaches the valve opening starting value, a first timing is set.

On the other hand, when the command value of the injection quantity is determined to be less than or equal to the predetermined value, as the valve opening starting timing described above, a second timing is set.

The second timing is set to a time point which is later than the first timing.

Thus, when the command value of the injection quantity is less than or equal to the predetermined value, namely when a fuel injection by a small injection quantity is performed in which the injection quantity (calculated value) is less than or equal to the predetermined value is performed, as the valve opening starting timing described above, the second timing that is later than the first timing is selected.

Therefore, in the control period after starting a charging of the layered piezoelectric element until the valve opening starting timing (the charging amount increasing period, for example), the layered piezoelectric element comes to be charged with a loose energization condition, namely with less charging current. Thus, because valve opening start of the valve body of the fuel injector can be delayed, the actual injection quantity can be reduced by that portion (compared to a fuel injector with high valve opening responsiveness, for example).

Therefore, because the actual injection quantity can be reduced even when the injection command value (the command value of the injection period) is not made less than or equal to the charging period, for example, the timing of discharging start can be made the timing when the charging amount reaches the final target value onward. As a result, in the fuel injector with improved valve opening responsiveness, the valve opening behavior of the valve body of the fuel injector in fuel injection by a small injection quantity can be stabilized without replacing the control device, particularly the drive circuit, with a large current specification.

On the other hand, when the command value of the injection quantity is greater than the predetermined value, namely when a fuel injection by a large injection quantity is performed in which the injection quantity (calculated value) is greater than the predetermined value, as the valve opening starting timing described above, the first timing (tm) that is earlier than the second timing is selected.

Accordingly, the energization condition can be set within the range of the capacity of the drive circuit of the present state, for example. Thus, the effect obtained by improving the valve opening responsiveness can be enjoyed at the maximum within the range of the capacity of the drive circuit of the present state, for example.

Therefore, according to the configuration described above, a priority can be given to stabilization of the valve opening behavior of the valve body of the fuel injector when a fuel injection by a small injection quantity is performed in which the injection quantity (calculated value) is less than or equal to the predetermined value, and a priority can be given to secure the effect obtained by improving the valve opening responsiveness when a fuel injection by a large injection quantity is performed in which the injection quantity (calculated value) is greater than the predetermined value.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

[First Embodiment]

Figure 1:
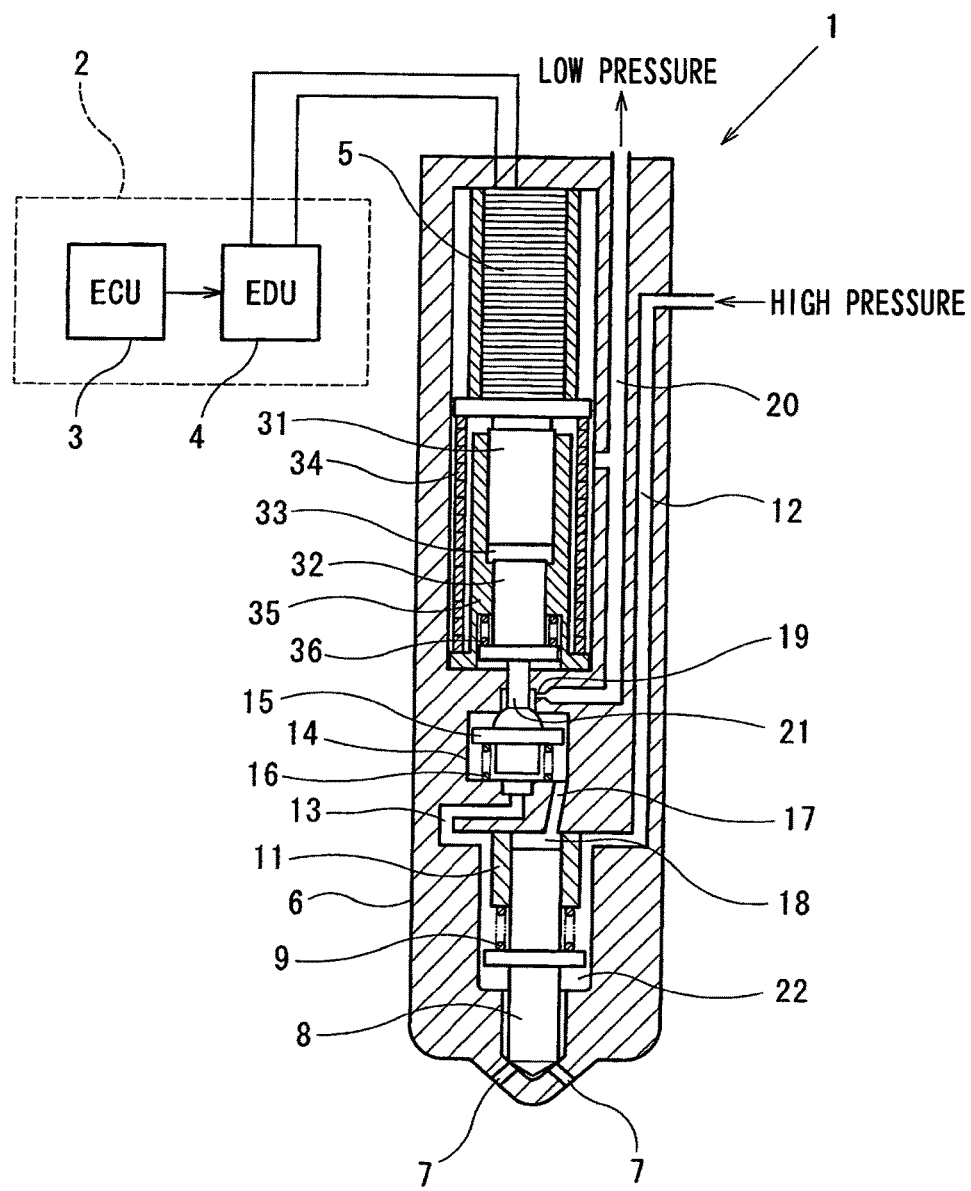
FIG. 1 is a configuration drawing showing a schematic configuration of a fuel injection device according to a first embodiment.

FIG. 1 to FIG. 8 show a fuel injection device of an internal combustion engine to which the present disclosure is applied.

The fuel injection device of the internal combustion engine of the present embodiment includes an oil hydraulic type fuel injector (piezoelectric injector: hereinafter referred to as an injector 1) that injects fuel into each cylinder of the internal combustion engine, and a fuel injection control device (hereinafter referred to as a control device 2) that controls a fuel injection of this injector 1.

The fuel injection device is configured of a common rail type fuel injection system for a diesel engine.

The common rail type fuel injection system includes a high pressure fuel pump (hereinafter referred to as a supply pump) in which a feed pump that pumps up the fuel from a fuel tank is built in, a fuel distribution pipe (hereinafter referred to as a common rail) to which the high pressure fuel discharged from the discharge port of this supply pump is introduced, and plural injectors 1 to which the high pressure fuel is distributed and supplied from each fuel outlet of this common rail.

The control device 2 includes an engine control unit (hereinafter referred to as an ECU 3), and a piezo drive circuit (hereinafter referred to as an EDU 4) controlled by various signals outputted from this ECU 3.

The ECU 3 outputs a control signal (various command values such as an injection command value, a charging command value, and a charging period signal, for example) to the EDU 4.

The EDU 4 is a piezoelectric actuator drive circuit performing charging/discharging control of the laminated piezoelectric element 5 that drives to open/close the valve body (will be described below) of the injector 1. When a valve opening drive command (injection command value ON) is inputted from the ECU 3, the EDU 4 performs charging control of the laminated piezoelectric element 5. Also, when a valve closing drive command (injection command value OFF) is inputted from the ECU 3, the EDU 4 performs discharging control of the laminated piezoelectric element 5. Thus, the injection quantity, injection timing, and injection period of the fuel injection from the injection hole (will be described below) of each injector 1 are controlled.

Here, when an in-line 4-cylinder engine in which the first to fourth cylinders are arrayed in this order is employed as the engine, the order of the fuel injection of each cylinder is the first cylinder #1→ third cylinder #3→ fourth cylinder #4→ second cylinder #2, and the intake stroke and the like are performed in this order.

Also, each cylinder #1-#4 of the engine is configured such that the fuel injection by valve opening of the injector 1 of each cylinder is started in the vicinity of the top dead center (TDC) of the compression stroke of each cylinder for example at the injection timing shifted by every 180° CA (crank angle).

The injector 1 is used as a fuel injector for a common rail type fuel injection system. This injector 1 includes a housing 6 that integrates a nozzle body and an injector body, plural injection holes 7 that communicate the inside and the outside of this housing 6 with each other, and a nozzle needle (hereinafter referred to as a needle 8) that contacts with and separates from an annular seat on the upstream side in the fuel flow direction of these injection holes 7 and opens/closes the plural injection holes 7.

The injector 1 adjusts (increases/decreases) the fuel pressure inside the control chamber (will be described below) arranged right above the needle 8 by driving to open/close the control valve (will be described below) utilizing the expansion/shrinkage displacement of the laminated piezoelectric element 5, and controls the opening/closing motion of the needle 8. Thus, the fuel injection quantity, injection timing, and injection pattern (injection rate) of the injection into the combustion chamber of the cylinder of the engine are controlled.

On the opposite side of the injection hole of the housing 6, an inlet port is arranged which is connected to a high pressure generating section such as a supply pump or a common rail arranged on the high pressure side of the fuel system through high pressure piping. On the opposite side of the injection hole of this housing 6, an outlet port is arranged which is connected to a fuel tank arranged on the low pressure side of the fuel system or the low pressure section and the like of the fuel supply path through low pressure piping.

Also, inside an actuator storing hole of the housing 6, an actuator and the like including the laminated piezoelectric element 5 are stored.

Further, the detail of the actuator of the present embodiment will be described below.

The housing 6 includes a nozzle body that forms a nozzle accompanying the needle 8, and an injector body that is disposed on the opposite side of the injection hole of this nozzle body. Further, although the nozzle body and the injector body are shown as an integrated component in FIG. 1, they are separate components actually, and are integrated by retaining nuts.

Also, inside the needle storing hole of the housing 6, the needle 8 that is reciprocally movable in the axial direction and a nozzle spring 9 that energizes this needle 8 in the valve closing direction are stored.

Further, inside the needle storing hole of the housing 6, a cylindrical nozzle cylinder 11 is arranged which slidably supports the sliding section that is located on the opposite side of the injection hole of the needle 8.

In the housing 6, a valve storing chamber 14 is formed which is a control valve chamber to which the high pressure fuel is introduced from high pressure fuel paths 12, 13. Inside this valve storing chamber 14, a control valve (hereinafter referred to as a control valve 15) that controls to increase and decrease the fuel pressure applied to the needle 8 in the valve closing direction and a valve spring 16 that energizes this control valve 15 to the direction of switching motion from the high pressure seat (state) side to the low pressure seat (state) side (valve closing direction) are stored.

On the wall surface of the valve storing chamber 14, an annular high pressure seat surface on which the high pressure side valve section of the control valve 15 can sit and an annular low pressure seat surface on which the low pressure side valve section of the control valve 15 can sit are arranged.

In the center part of the high pressure seat surface, a high pressure port opens which communicates the high pressure fuel paths 12, 13 and the valve storing chamber 14 each other.

On the wall surface of the valve storing chamber 14, a communication port is formed which communicates the valve storing chamber 14 and a control chamber 18 each other at all times through a common channel 17.

In the center part of the low pressure seat surface, a low pressure port that communicates the valve storing chamber 14 and a low pressure fuel path 20 each other through an out orifice 19 opens.

The control valve 15 corresponds to the valve body of the fuel injector. This control valve 15 is driven to open the valve forcibly by a valve piston (will be described below) of the actuator through a displacement transmitting member (pin) 21. Also, the control valve 15 is a control valve with a 3-way valve structure switching the low pressure seal state and the high pressure seal state.

The control valve 15 includes a low pressure side valve section (first valve body) that contacts with and separates from the low pressure seat surface of the housing 6 and opens/closes the low pressure port, a high pressure side valve section (second valve body) that contacts with and separates from the high pressure seat surface of the housing 6 and opens/closes the high pressure port, and so on.

Inside the housing 6, the control chamber 18, a fuel reservoir chamber 22, and the like are stored.

The control chamber 18 is a space surrounded by the end surface of the sliding section of the needle 8, the wall surface (ceiling surface) of the control chamber 18, and the inner peripheral surface of the nozzle cylinder 11. The fuel pressure introduced into this control chamber 18 is applied to the needle 8 as an energizing force that energizes the needle 8 to the valve closing direction.

The fuel reservoir chamber 22 is arranged on the downstream side of the fuel flow of the spring storing chamber that stores the nozzle spring 9. The fuel pressure introduced into this fuel reservoir chamber 22 is applied to the needle 8 as an energizing force that energizes the needle 8 to the valve opening direction.

Next, the detail of the actuator of the present embodiment will be explained briefly based on FIG. 1 to FIG. 3.

The actuator includes the laminated piezoelectric element 5 that is obtained by laminating a number of piezoelectric elements that expand/shrink in the axial direction (laminating direction) by charging/discharging of the electric charge in the axial direction thereof. With respect to this laminated piezoelectric element 5, the piezoelectric charging voltage or the piezoelectric charging current is applied between a pair of the piezoelectric lead terminals from the EDU 4.

With respect to the actuator, when charging control of the laminated piezoelectric element 5 is performed corresponding to the injector valve opening drive command (injection start command) that is imparted from the ECU 3 to the EDU 4, the electric charge is charged to the laminated piezoelectric element 5. Also, with respect to the actuator, when discharging control of the laminated piezoelectric element 5 is performed corresponding to the injector valve closing drive command (injection finish command) that is imparted from the ECU 3 to the EDU 4, the electric charge is discharged from the laminated piezoelectric element 5.

Here, in the injector 1 that includes the laminated piezoelectric element 5, with the aim of supplementing the shortage portion of the displacement amount (extension amount) with respect to the magnitude of the drive force which is the feature of the laminated piezoelectric element 5, a displacement expanding mechanism that expands the extension displacement of the laminated piezoelectric element 5 according to the pressure receiving area ratio of a piezoelectric piston 31 and a valve piston 32 and transmits the extension displacement to the valve piston 32 is provided between the laminated piezoelectric element 5 and the control valve 15.

The displacement expanding mechanism includes the piezoelectric piston (large diameter piston) 31 that is integrally movably connected to the laminated piezoelectric element 5 receiving the expansion/shrinkage displacement of the laminated piezoelectric element 5, the valve piston (small diameter piston) 32 that is integrally movably connected to the control valve 15, and an oil tight chamber 33 to which the working oil (fuel) is filled. This displacement expanding mechanism is configured such that the valve piston 32 switchingly drives the control valve 15 to the direction generally the same as the displacement direction of the laminated piezoelectric element 5.

The displacement expanding mechanism includes the displacement transmitting member 21 that transmits the displacement of the valve piston 32 to the control valve 15 and makes the control valve 15 forcibly operate to switch from the low pressure seat (state) side to the high pressure seat (state) side (valve opening direction), and a piezoelectric spring (slit spring) 34 that imparts a preset load to the laminated piezoelectric element 5. Also, the displacement expanding mechanism includes a cylindrical piston cylinder 35 that reciprocally and slidably supports the piezoelectric piston 31 and the valve piston 32, and a valve piston spring 36 that generates an energizing force for energizing the valve piston 32 in the valve opening direction of the control valve 15.

Here, when it becomes the starting timing of charging to the laminated piezoelectric element 5, charging to the laminated piezoelectric element 5 is started. At the same time, increase of the charging voltage is started, and the extension displacement of the laminated piezoelectric element 5 to one side in the axial direction (laminating direction) thereof is also started. Because the piezoelectric piston 31 displaces accompanying it, the volume of the oil tight chamber 33 is reduced according to the displacement amount of the piezoelectric piston 31, and the fuel pressure (oil pressure) inside the oil tight chamber 33 increases. Also, when the charging voltage reaches the first predetermined value (valve opening starting value: V0) and the extension displacement of the laminated piezoelectric element 5 reaches the first predetermined value, the oil pressure inside the oil tight chamber 33 rises to equal to or greater than the first predetermined value.

Further, when the oil pressure inside the oil tight chamber 33 rises to equal to or greater than the first predetermined value, the valve piston 32 is driven to the direction generally the same as the displacement direction of the laminated piezoelectric element 5. Also, the control valve 15 is driven to open the valve accompanying movement of the valve piston 32.

On the other hand, when it becomes the finishing timing of charging (starting timing of discharging) to the laminated piezoelectric element 5, discharging of the laminated piezoelectric element 5 is started. When the laminated piezoelectric element 5 shrinks and the piezoelectric piston 31 is returned to a middle position accompanying it, the volume of the oil tight chamber 33 is expanded, and the oil pressure inside the oil tight chamber 33 drops.

Also, accompanying drop of the oil pressure inside the oil tight chamber 33, the control valve 15 and the valve piston 32 are pushed back by the energizing force of the valve spring 16. Thus, the control valve 15 is driven to close the valve accompanying movement of the valve piston 32.

Next, the detail of the control device 2 of the present embodiment will be explained briefly based on FIG. 1 to FIG. 3.

The control device 2 doubles as a pump control device that drives the pump actuator of the supply pump and a piezoelectric control device that drives the laminated piezoelectric element 5 of the injector 1.

The pump control device includes a pump drive circuit that drives the pump actuator and controls the injection pressure (combustion pressure) that is the common rail pressure of the fuel injected from the injection holes 7 of the injector 1, and the ECU 3 that outputs the pressure increase command of the common rail pressure and the pressure decrease command of the common rail pressure to this pump drive circuit.

The piezoelectric control device includes the ECU 3 that outputs the injection command value ON signal and the injection command value OFF signal, and the EDU 4 that performs charging/discharging control of the laminated piezoelectric element 5 of the injector 1.

In the ECU 3, a microcomputer with a known structure is built-in which is configured to include the functions of a CPU, memory (ROM, RAM and the like), input circuit (input section), output circuit (output section), timer circuit, and the like.

Also, it is configured such that the output signal from the common rail pressure (combustion pressure) sensor attached to the common rail and the output signal from various sensors are ND converted by the ND conversion circuit, and are thereafter inputted to the input section of the microcomputer.

Here, to the input section of the microcomputer, not only the common rail pressure sensor but also the air flow meter, NE sensor, G sensor, accelerator opening sensor, throttle opening sensor, water temperature sensor, combustion temperature sensor and the like are connected.

The NE sensor is formed of a pickup coil that converts the rotation angle of the crankshaft of the engine to an electric signal, and NE pulse signals are outputted to the ECU 3 at every 15° or 30° CA, for example.

The ECU 3 has a function as a rotational speed detection section for detecting the engine rotational speed (number of revolution of engine: NE) by measuring the time interval of the NE pulse signal outputted from the NE sensor.

The G sensor outputs an electric signal corresponding to the rotation angle of the camshaft that drives the intake valve or the exhaust valve of each cylinder of the engine to the ECU 3.

The ECU 3 detects the top dead center (TDC) of each cylinder of the engine, engine rotational speed (NE), and crank angle using the NE sensor and the G sensor, and discriminates the cylinder to which the fuel is to be injected.

The ECU 3 calculates the target value of the injection pressure (target common rail pressure) of the fuel according to the operation state of the engine (the engine rotational speed and the like, for example). The ECU 3 calculates the control command value imparted to the supply pump according to the pressure deviation between the output signal of the combustion pressure sensor (common rail pressure: Pc) and the target common rail pressure, and outputs the pump control signal corresponding to the control command value to the drive circuit of the pump actuator.

Here, the control device 2 of the present embodiment corresponds to the injection quantity determining section, the determining section, and the setting section.

This control device 2 includes an injection control section that performs split injection (multi-injection) for performing fuel injection from the injector 1 during one combustion cycle of each cylinder of the engine being divided into plural times.

This injection control section is configured to perform a minute injection of a minute amount other than the main injection prior to the main injection that possibly becomes the combustion torque of the engine during one combustion cycle of each cylinder of the engine. In this case, as the minute injection other than the main injection, the pre-injection of once or more, or the pilot injection of once or more, and the like can be cited.

Also, the injection control section is configured to perform a minute injection of a minute amount other than the main injection after the main injection during one combustion cycle of each cylinder of the engine. In this case, as the minute injection other than the main injection, the after injection of once or more, the post-injection of once or more, and the like can be cited.

Further, the injection control section is configured to perform the pre-injection of once or more, or the pilot injection of once or more prior to the main injection and to further perform the after injection of once or more and the post-injection of once or more after the main injection during one combustion cycle of each cylinder of the engine.

Next, the detail of the EDU 4 of the present embodiment will be explained briefly based on FIG. 1 to FIG. 3.

The EDU 4 corresponds to the charging control section and the creation section. This EDU 4 includes a charging/discharging coil that is connected to the laminated piezoelectric element 5 in series, a condenser that stores electric energy for charging the laminated piezoelectric element 5, a charging switch that operates at the time of charging of the laminated piezoelectric element 5, and a discharging switch that operates at the time of discharging of the laminated piezoelectric element 5.

The EDU 4 includes a charging/discharging control section (control IC) that controls the motion of the charging switch and the discharging switch, a current detecting section that detects the piezoelectric charging current flowing through the laminated piezoelectric element 5, and a voltage detecting unit that detects the piezoelectric charging voltage applied to the laminated piezoelectric element 5.

In the charging/discharging control section, a microcomputer with a known structure is built-in which is configured to include the functions of a CPU and memory (ROM, RAM and the like).

Also, the memory (ROM, RAM and the like) forms a storage section that stores the charging control program, the discharging control program, the control data required for charging/discharging control of the laminated piezoelectric element 5 (calculation value, detection value, and measured value), and the like.

The charging control program is a program for performing charging control of the laminated piezoelectric element 5 according to the charging pattern with respect to the laminated piezoelectric element 5. This charging control program is executed during the charging period (approximately 100 μsec, for example) after charging of the laminated piezoelectric element 5 starts until charging of the laminated piezoelectric element 5 finishes as shown in FIG. 2 and FIG. 3.

The discharging control program is a program for performing discharging control of the laminated piezoelectric element 5 according to the discharging pattern with respect to the laminated piezoelectric element 5. This discharging control program is executed during the piezoelectric discharging period after discharging of the laminated piezoelectric element 5 starts until discharging of the laminated piezoelectric element 5 finishes.

Figure 3:
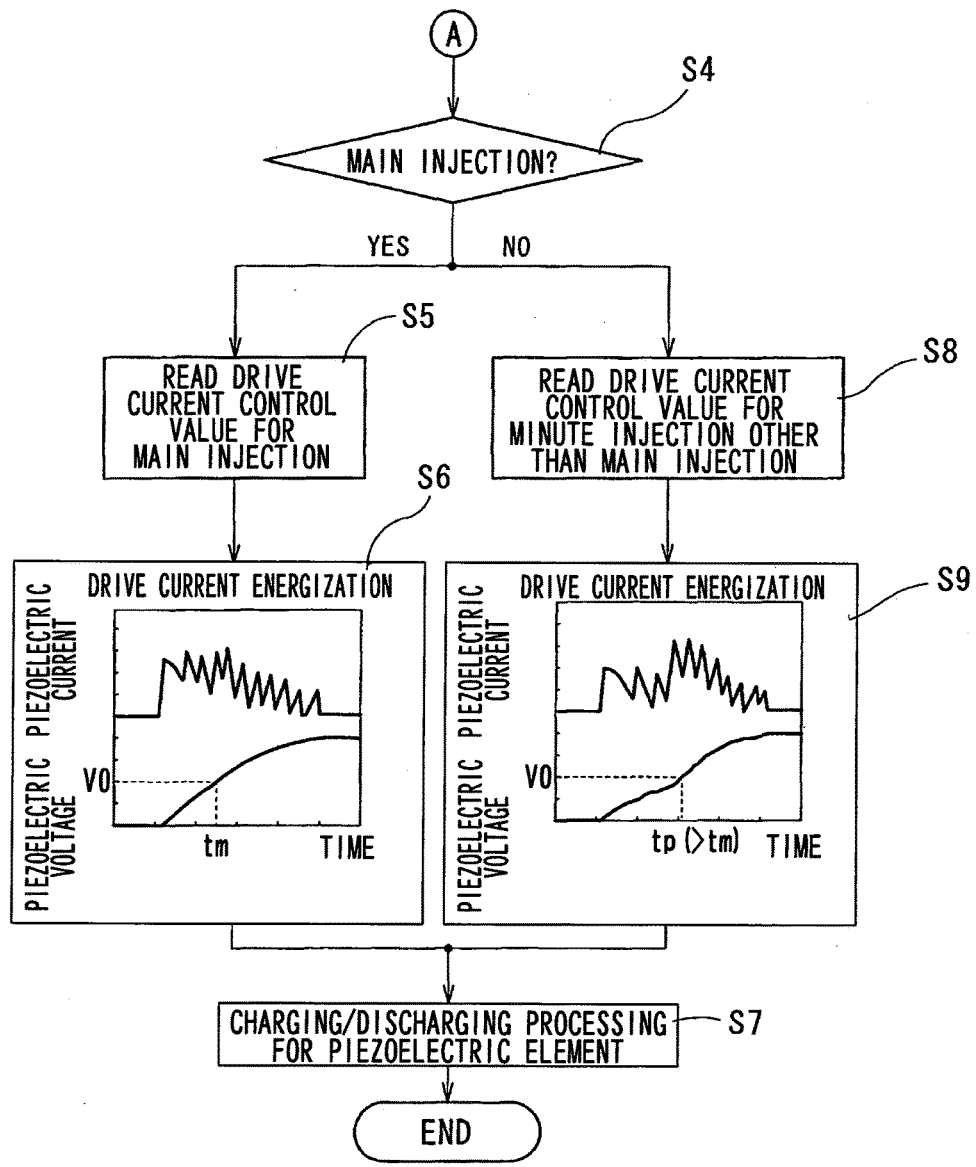
FIG. 3 is a flowchart showing a charging control method for a layered piezoelectric element according to the first embodiment.

In the charging control program, data tables (first and second charging control maps) are included which express plural charging control patterns with different valve opening timing (tm, tp) of the injector 1 in a predetermined form (refer to FIG. 3). This charging control program is stored in the ROM of the EDU 4 beforehand along with the discharging control program.

The plural charging control patterns have at least two or more first and second charging control patterns.

Figure 5:
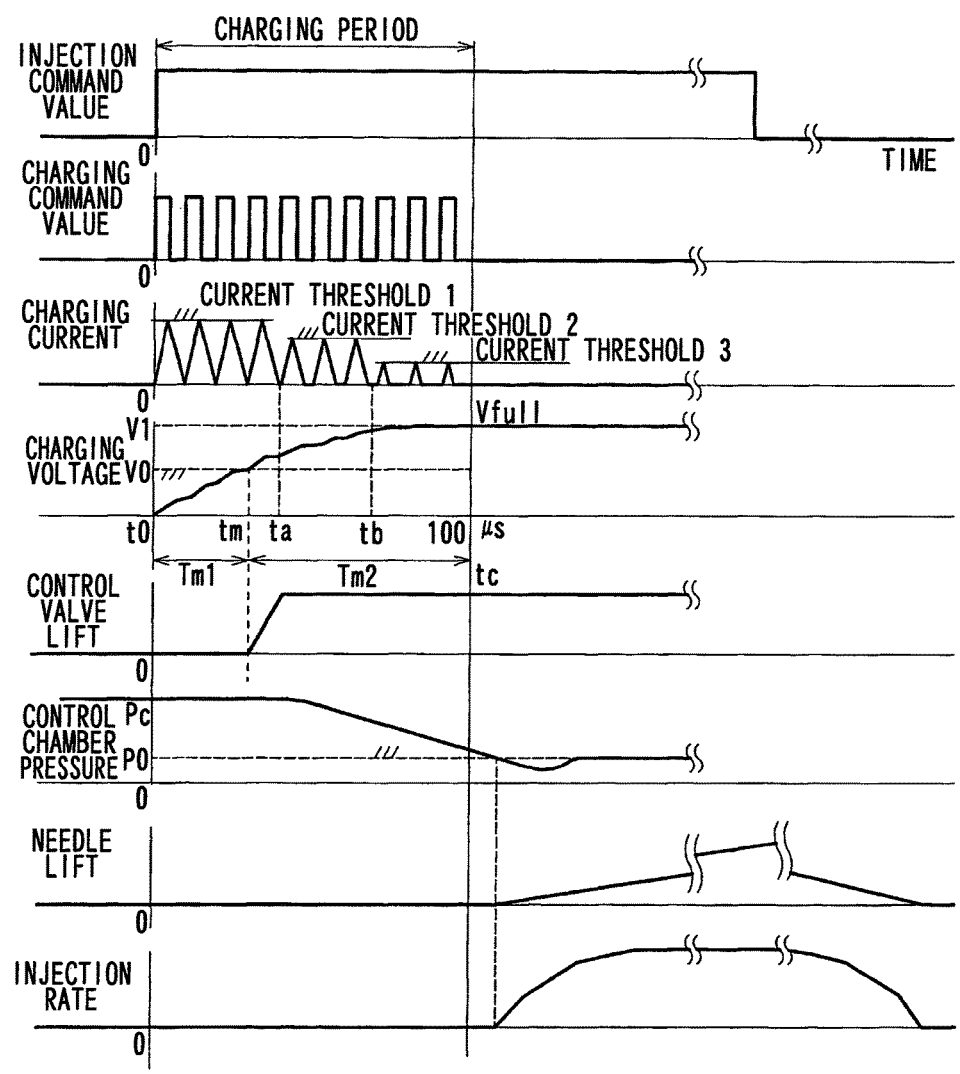
FIG. 5 is a timing chart showing the charging control at the time of a fuel injection by a large injection quantity according to the first embodiment.
Figure 8:
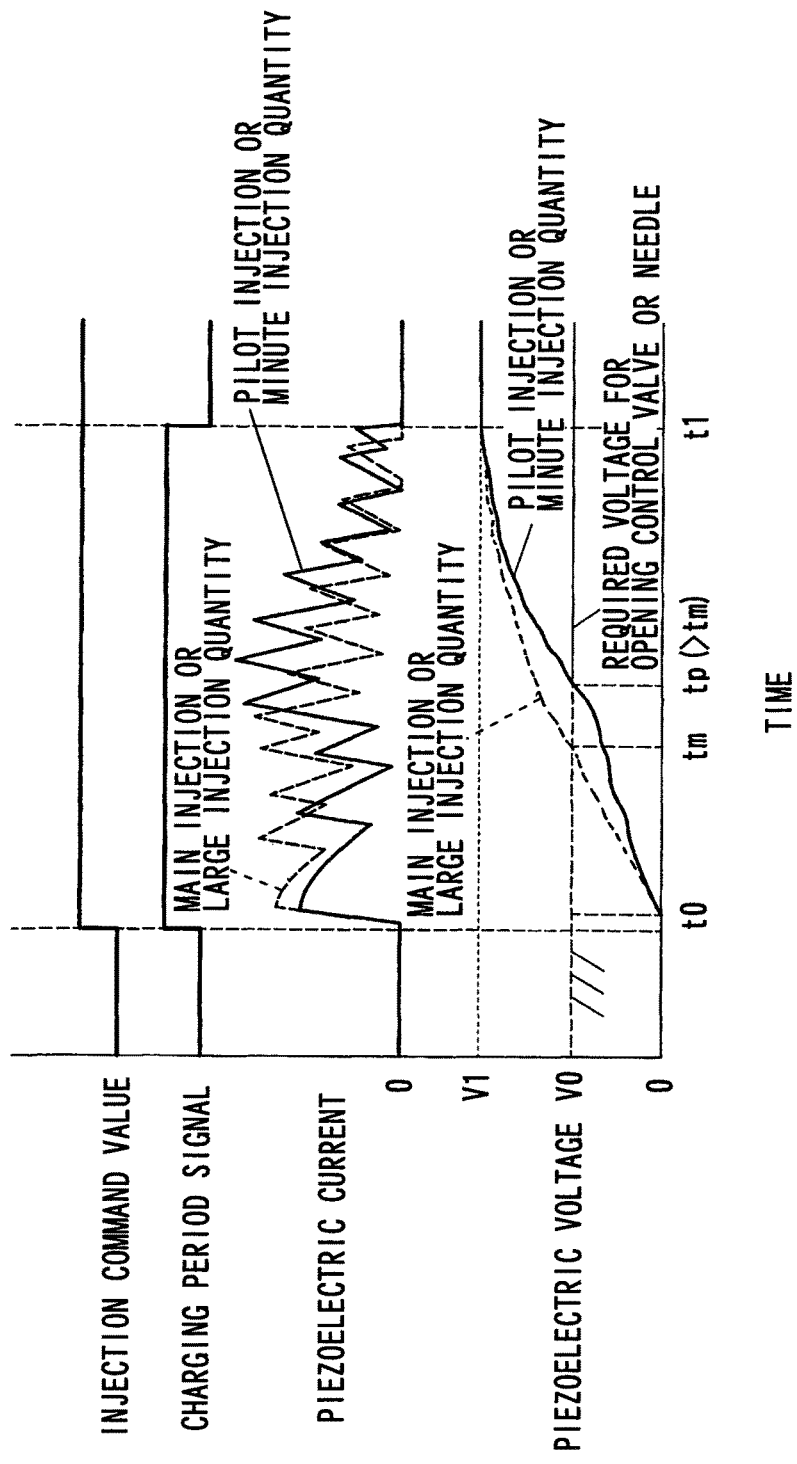
FIG. 8 is a timing chart showing the variation of the injection command value, charging period signal, piezoelectric current, and piezoelectric charging voltage at the time of charging control according to the first embodiment.

In the first charging control pattern, piezoelectric current control and charging control of the piezoelectric charging voltage for the main injection are shown as shown in FIG. 3, FIG. 5, and FIG. 8.

Figure 6:
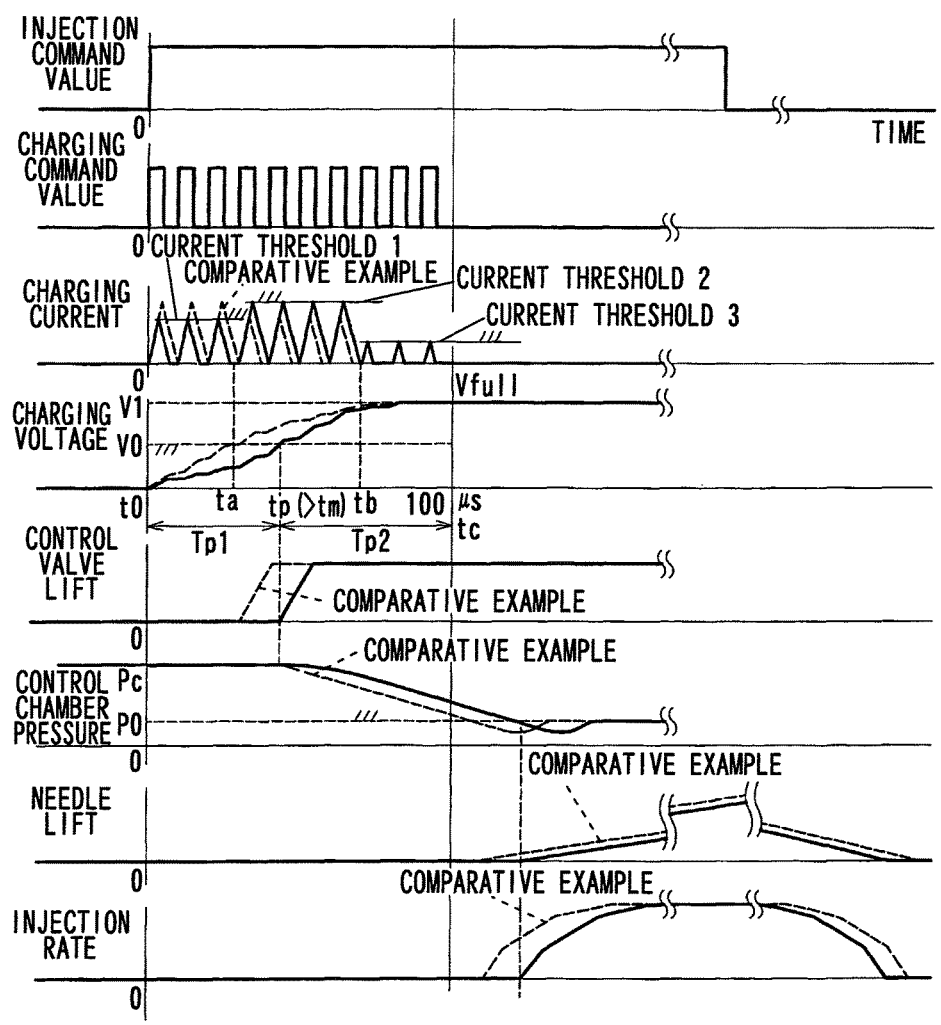
FIG. 6 is a timing chart showing the charging control at the time of a fuel injection by a minute injection quantity according to the first embodiment.

In the second charging control pattern, piezoelectric current control and charging control of the piezoelectric charging voltage for the minute injection other than the main injection are shown as shown in FIG. 3, FIG. 6, and FIG. 8.

Also, in the first and second charging control maps shown in FIG. 3, the charging finishing time voltage value (hereinafter referred to as the full charging voltage value: V1) is set which is higher than the charging voltage value required for valve opening of the control valve 15 (hereinafter referred to as the valve opening starting value: V0) based on the common rail pressure (Pc) detected by the common rail pressure sensor.

The valve opening starting value (V0) means the intermediate target value of the charging voltage of the laminated piezoelectric element 5.

The full charging voltage value (V1) means the final target value of the charging voltage of the laminated piezoelectric element 5.

Also, "P0" in FIG. 5 and FIG. 6 represents the needle valve opening starting pressure or so-called needle valve opening pressure. Further, Pc represents the common rail pressure (combustion pressure).

Therefore, the ROM of the EDU 4 stores the first and second charging control maps shown in FIG. 3 by plural numbers for each different common rail pressure (combustion pressure).

The first charging control pattern is used when the command value of the injection quantity corresponding to the required injection quantity (Q) is determined to be greater than a predetermined value. As the command value of the injection quantity, the target injection quantity in the main injection of the split injection, namely the main injection quantity (Qm) is used.

In the first charging control pattern, as the control period after start of charging to the laminated piezoelectric element 5 until reaching the valve opening starting value (V0), the first period (Tm1) that is shorter than the second period (Tp1) is set. Also, the first valve opening timing (tm) when the charging voltage reaches the valve opening starting value (V0) is advanced from the second valve opening timing (tp) of the second charging control pattern.

The first charging control pattern is a charging control pattern used in performing a main injection in both of the case of not performing a split injection (injection number of times is once: injected once for main injection only) or the case of performing a split injection (injection number of times is twice or more).

In the first half of the charging period, namely the first period (Tm1), as shown in FIG. 5, the EDU 4 controls the charging current supplied to the laminated piezoelectric element 5 receiving the charging command value corresponding to the injection command value, and the increasing rate of the charging voltage of the laminated piezoelectric element 5 is made faster than that in the second charging control pattern.

In the latter half of the charging period, namely the period (Tm2) after reaching the valve opening starting value (V0) until reaching the full charging voltage value (V1), the EDU 4 controls the charging current supplied to the laminated piezoelectric element 5, and the increasing rate of the charging voltage of the laminated piezoelectric element 5 is made slower than that in the second charging control pattern.

The second charging control pattern is used when the command value of the injection quantity corresponding to the required injection quantity (Q) is determined not be greater than a predetermined value. As the command value of the injection quantity, the target injection quantity in the minute injection other than the main injection of a split injection, namely the pilot injection quantity (Qp) is used.

In the second charging control pattern, as the control period after start of charging to the laminated piezoelectric element 5 until reaching the valve opening starting value (V0), the second period (Tp1) that is a period of time longer than the first period (Tm1) is set. Also, the second valve opening timing (tp) when the charging voltage reaches the valve opening starting value (V0) is delayed from the first valve opening timing (tm). At this time, the injection command value (Tqp) is corrected to a value equal to or greater than the charging period (Tp1+Tp2).

The second charging control pattern is a charging control pattern used in performing the minute injection (pilot injection) other than the main injection even when the split injection is performed (injection number of times is twice or more).

In the first half of the charging period, namely the second period (Tp1), as shown in FIG. 6, the EDU 4 controls the charging current supplied to the laminated piezoelectric element 5 receiving the charging command value corresponding to the injection command value, and the increasing rate of the charging voltage of the laminated piezoelectric element 5 is made slower than that in the first charging control pattern.

In the latter half of the charging period, namely the period (Tp2) after reaching the valve opening starting value (V0) until reaching the full charging voltage value (V1), the EDU 4 controls the charging current supplied to the laminated piezoelectric element 5, and the increasing rate of the charging voltage of the laminated piezoelectric element 5 is made faster than that in the first charging control pattern.

Here, in two first and second charging control patterns, the charging finishing time reaching voltage ($V_{full}$=V1) which is the reaching voltage at the time point when charging of the laminated piezoelectric element 5 finishes after charging of the laminated piezoelectric element 5 starts is equal.

Also, in two first and second charging control patterns, the charging finishing reaching timing ($t_{full}$=t1=tc) of reaching the charging finishing time reaching voltage ($V_{full}$=V1) after charging of the laminated piezoelectric element 5 starts is equal.

Further, the charging period, the charging finishing time reaching voltage ($V_{full}$=V1) that is the full charging voltage value, and the charging finishing reaching timing ($t_{full}$=t1=tc) are changed according to the common rail pressure (combustion pressure).

When the injector valve opening drive command is inputted from the outside such as the ECU 3, the EDU 4 performs charging control of charging the laminated piezoelectric element 5 according to the first and second charging control patterns with respect to the laminated piezoelectric element 5. More specifically, charging control of charging the laminated piezoelectric element 5 is performed by performing chopper control by repeating ON/OFF of the charging switch in a state the charging switch is turned off.

When the injector valve closing drive command is inputted from the outside such as the ECU 3, the EDU 4 performs discharging control of discharging the laminated piezoelectric element 5 according to the discharging pattern with respect to the laminated piezoelectric element 5. More specifically, discharging control of the laminated piezoelectric element 5 is performed by performing chopper control by repeating ON/OFF of the discharging switch in a state the charging switch is turned off.

In the first half of charging of the first charging control pattern, as shown in FIG. 3 and FIG. 5, in order to make the increasing rate of the charging voltage of the laminated piezoelectric element 5 faster than that in the second charging control pattern, the energization current supplied to the laminated piezoelectric element 5 (hereinafter referred to as the piezoelectric current) is made greater than that in injection other than the main injection (pilot injection).

Also, in the latter half of charging of the first charging control pattern, as shown in FIG. 3 and FIG. 5, in order to make the increasing rate of the charging voltage of the laminated piezoelectric element 5 slower than that in the second charging control pattern, the piezoelectric current supplied to the laminated piezoelectric element 5 is made less than that in the pilot injection.

On the other hand, in the first half of charging of the second charging control pattern, as shown in FIG. 3 and FIG. 6, in order to make the increasing rate of the charging voltage of the laminated piezoelectric element 5 slower than that in the first charging control pattern, the piezoelectric current supplied to the laminated piezoelectric element 5 is made less than that in the main injection.

Also, in the latter half of charging of the second charging control pattern, as shown in FIG. 3 and FIG. 6, in order to make the increasing rate of the charging voltage of the laminated piezoelectric element 5 faster than that in the first charging control pattern, the piezoelectric current supplied to the laminated piezoelectric element 5 is made greater than that in the main injection.

The control device 2 of the present embodiment includes a first setting section that sets the first timing (tm) which is the time earlier than the second timing (tp) as the valve opening starting timing (valve opening timing) when the charging voltage of the laminated piezoelectric element 5 reaches the valve opening starting value (V0) when it is determined that the main injection signal has been inputted. This first setting section includes a first period setting section that sets the first period (Tm1) which is the period of time shorter than the second period (Tp1) as the control period after start of charging to the laminated piezoelectric element 5 until reaching the valve opening starting value (V0) when it is determined that the main injection signal has been inputted. Alternatively, the first setting section includes a first rate setting section that sets the first charging rate (Vm) which is a faster rate than the second charging rate (Vp) as the charging increasing rate after start of charging to the laminated piezoelectric element 5 until reaching the valve opening starting value (V0) when it is determined that the main injection signal has been inputted.

Also, the control device 2 includes a second setting section that sets the second timing (tp) which is the time later than the first timing (tm) as the valve opening starting timing (valve opening timing) when the charging voltage of the laminated piezoelectric element 5 reaches the valve opening starting value (V0) when it is determined that the pilot injection signal has been inputted. This second setting section includes a second period setting section that sets the second period (Tp1) which is the time longer than the first period (Tm1) as the control period after start of charging to the laminated piezoelectric element 5 until reaching the valve opening starting value (V0) when it is determined that the pilot injection signal has been inputted. Alternatively, the second setting section includes a second rate setting section that sets the second charging rate (Vp) which is a slower rate than the first charging rate (Vm) as the charging increasing rate after start of charging to the laminated piezoelectric element 5 until reaching the valve opening starting value (V0) when it is determined that the pilot injection signal has been inputted.

Also, when charging control of the laminated piezoelectric element 5 is performed according to two of the first and second charging control patterns, as shown in FIG. 8, at the time point the period after turning on until turning off of the charging period signal corresponding to the charging period finishes, the full charging voltage value ($V_{full}=V1$) and the charging finishing reaching timing ($t_{full}=t1$) become equal in both of the first and second charging control patterns.

Here, the charging finishing reaching timing ($t_{full}=t1$) is made constant because, when the charging finishing reaching timing is delayed at the time of the minute injection such as the pilot injection, namely when the charging period becomes longer, the injection quantity lower limit controllable increases accompanying it.

Also, the full charging voltage value ($V_{full}=V1$) is made constant because the allowance degree with respect to the charging voltage (valve opening starting value: V0) (V1-V0) required for the valve opening motion of the control valve 15 is made constant regardless of the target injection quantity (Q).

[Control Method of First Embodiment]

Next, the charging/discharging control method of the present embodiment will be briefly explained based on FIG. 1 to FIG. 8.

Figure 2:
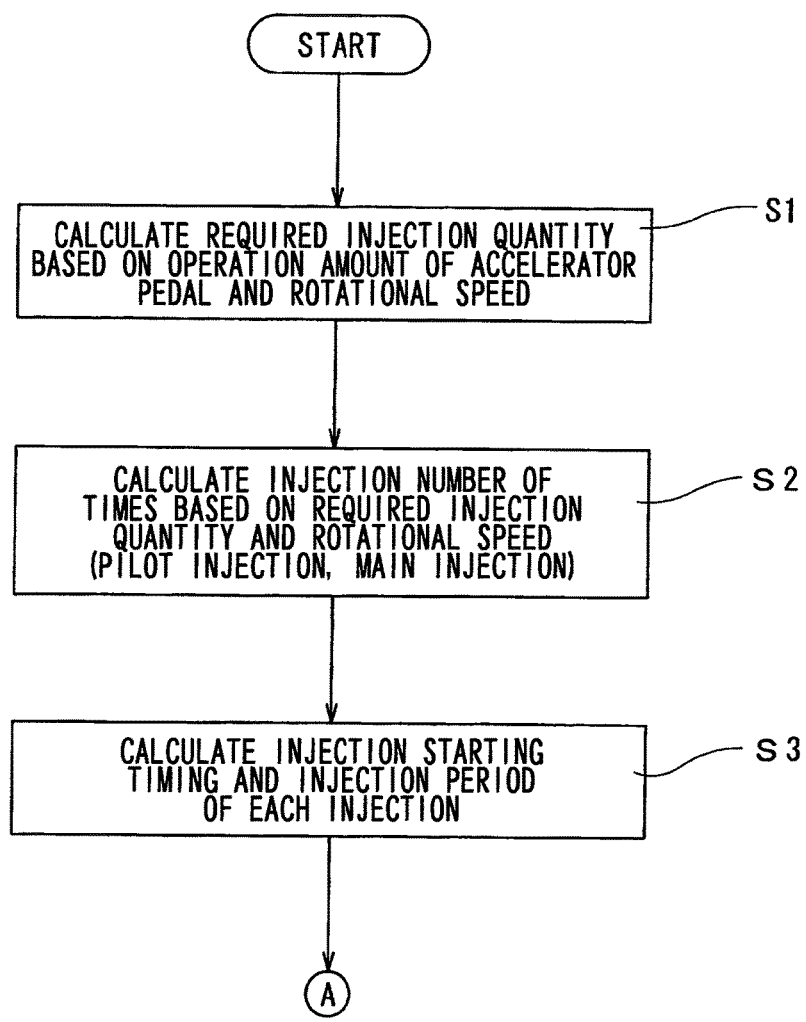
FIG. 2 is a flowchart showing a charging control method for a layered piezoelectric element according to the first embodiment.

Here, FIG. 2 and FIG. 3 are flowcharts showing the charging control method for the laminated piezoelectric element 5 by the control device 2. The control routine of these FIG. 2 and FIG. 3 is repeatedly performed at every predetermined control period (sampling period, for example) set beforehand after the ignition switch is turned on (IG: ON)

First, the ECU 3 of the control device 2 acquires the output signal of various sensors required for calculating the required injection quantity and the like at every predetermined control period set beforehand after the ignition switch is turned on (IG: ON) (sensor signal acquiring section).

In concrete terms, the output signal outputted from various sensors such as the common rail pressure sensor, NE sensor, G sensor, accelerator opening sensor, water temperature sensor, and combustion temperature sensor is acquired.

The ECU 3 calculates (sets) first the required injection quantity (calculation value) corresponding to the operation state of the engine (engine rotational speed, accelerator opening, engine torque and the like, for example) (required injection quantity determining section: S1).

In concrete terms, the required injection quantity for creating the output torque required according to the accelerator opening is calculated based on the operation amount of the accelerator pedal (accelerator opening) detected by the accelerator opening sensor and the engine rotational speed detected (measured) by measuring the interval time of the NE signal outputted from the NE sensor.

Next, the ECU 3 calculates (sets) the injection number of times in the split injection during one combustion cycle of each cylinder of the engine based on the operation state of the engine (required injection quantity and engine rotational speed, for example) (injection number determining section: S2).

In the injection number determining section, the case of not performing the split injection (injection number of times is once: injected once for main injection only) or the case of performing the split injection (injection number of times is twice or more) is determined based on the required injection quantity and the engine rotational speed. When the split injection is performed, the injection number of times possible during one combustion cycle of each cylinder of the engine is calculated (set) corresponding to the operation state of the engine, particularly the engine rotational speed (NE) and the engine load (accelerator opening: ACCP, for example) and based on the usable minimum injection quantity or injection command value (refer to FIGS. 4A and 4B).

Figure 4A:
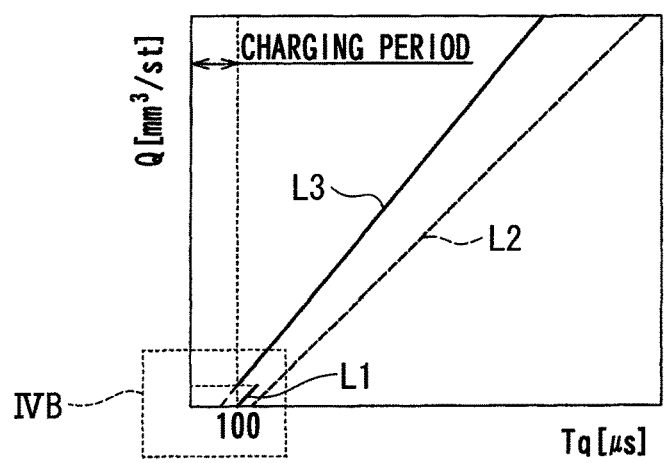
FIG. 4A is a characteristic drawing showing the relationship between the injection command value (Tq) and the injection quantity (Q) according to the first embodiment.
Figure 4B:
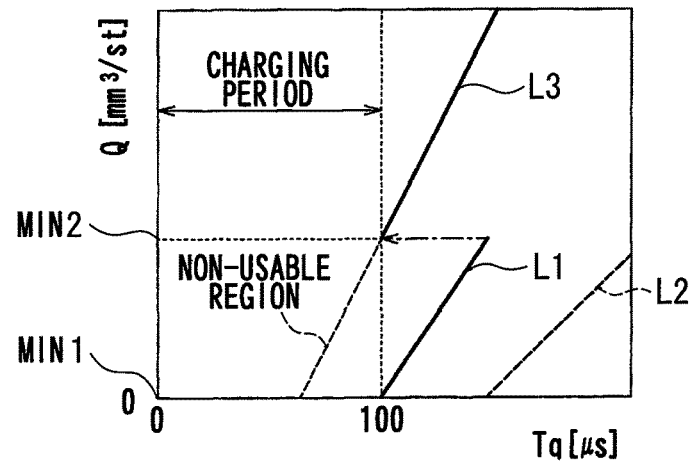
FIG. 4B is an enlarged view of a portion IVB in FIG. 4A.

In FIGS. 4A and 4B, a line L1 represents the embodiment (minute injection quantity or pilot injection), a line L2 represents a comparative example (responsiveness: low), and a line L3 represents a comparative example (responsiveness: high) and the embodiment (large injection quantity or main injection). In FIG. 4B, "MIN1" represents the minimum injection quantity of the embodiment (minute injection quantity or pilot injection), and "MIN2" represents the minimum injection quantity of the comparative example (responsiveness: low).

Next, the ECU 3 calculates (sets) the target injection quantity (Q) in each injection determined by the injection number of times, the command value of the injection starting timing, the command value of the injection period (injection command value) and the like (injection quantity command value determining section: S3).

In concrete terms, the ECU 3 calculates (sets) the command injection timing (T) based on the engine rotational speed and the required injection quantity (Q). Also, the ECU 3 calculates (sets) the injection command value (Tq) based on the required injection quantity (Q) and the common rail pressure (Pc). This injection command value (Tq) means the injection quantity command value (energization time, command injection period) with respect to the injector 1 of each cylinder.

Also, when the pilot injection of a minute amount is performed prior to the main injection during one combustion cycle, the ECU 3 calculates (sets) the main injection timing (Tm), main injection quantity (Qm), main injection command value (Tqm), pilot interval (INT), pilot injection timing (Tp), pilot injection quantity (Qp), and pilot injection command value (Tqp) (target injection quantity determining section).

Also, in the ROM, a data table (control map) that expresses Tq-Q characteristic data (Tq-Q characteristic curve) required for calculation of the injection command value (calculation value: Tq) in a predetermined form is stored beforehand.

Figure 7:
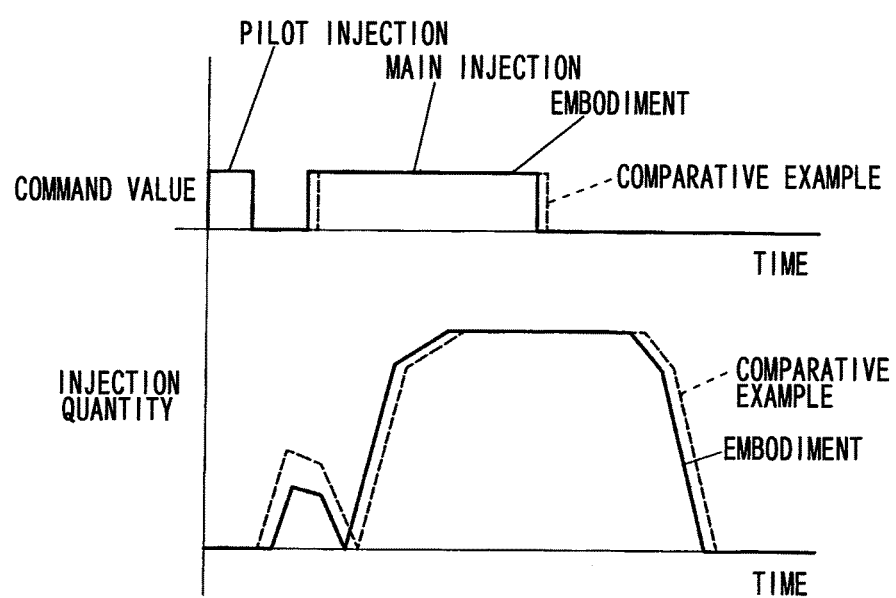
FIG. 7 is a timing chart showing the variation of the injection command value (Tq) and the injection quantity (Q) according to the first embodiment.

Next, in the control routine of FIG. 3, the case where the injection number of times in the split injection is twice, namely the case where the pilot injection of a minute amount is performed prior to the main injection as shown in FIG. 7 will be explained.

Here, when it becomes the timing of entering the control routine of FIG. 3 or when it becomes the timing that the control routine of FIG. 3 starts, first, the command value of the injection quantity corresponding to the injection quantity of the fuel in one valve opening period of the injector 1 (target injection quantity: Q set in FIG. 2) is read.

Here, when the main injection is performed as the next fuel injection, the main injection quantity (Qm) is set as the target injection quantity (Q). Also, the case where the main injection is performed corresponds to the case where the target injection quantity (Q) is greater than a predetermined value which is the case where the fuel injection by a large injection quantity is performed in which the target injection quantity (calculation quantity: Q) is greater than a predetermined value. In this case, a main injection signal is outputted from the ECU 3 to the EDU 4.

On the other hand, when the minute injection (pilot injection) other than the main injection is performed as the next fuel injection, the pilot injection quantity (Qp) is set as the target injection quantity (Q). Also, the case where the pilot injection is performed corresponds to the case where the target injection quantity (Q) is less than or equal to a predetermined value which is the case where the fuel injection by a small injection quantity is performed in which the target injection quantity (calculation amount: Q) is less than or equal to a predetermined value. In this case, a minute injection signal other than the main injection signal is outputted from the ECU 3 to the EDU 4.

Next, whether or not the EDU 4 inputs the main injection signal is determined, which means whether the main injection signal is inputted or whether the minute injection signal other than the main injection signal is inputted is determined (determining section: step S4). This step S4 corresponds to the determining section that determines whether or not the target injection quantity (Q) is greater than a predetermined value.

When the judgment result of step S1 is YES, the drive current control value for main injection is read so as to select one first charging control pattern out of the charging control patterns with respect to the laminated piezoelectric element 5 and to perform charging control of the laminated piezoelectric element 5 according to this first charging control pattern selected (step S5).

Next, after the charging voltage for the laminated piezoelectric element 5 reaches the full charging voltage value (V1) after start of charging to the laminated piezoelectric element 5, the charging voltage is maintained at the full charging voltage value (V1), and the fuel injection is continued.

As described above, energization of the laminated piezoelectric element 5 is controlled, and charging control of the laminated piezoelectric element 5 is performed according to the first charging control pattern or the second charging control pattern (step S6).

Next, when the valve closing drive command (injection command value OFF) is inputted from the ECU 3, discharging control of the laminated piezoelectric element 5 is performed (step S7). Thereafter, the process goes through the control routine of FIG. 3.

Here, the charging control at the time of fuel injection with a large injection quantity (main injection) will be explained based on the timing chart of FIG. 5.

At the same time the EDU 4 inputs the valve opening drive command (injection command value ON) from the ECU 3, the EDU 4 inputs the charging command value based on the first charging control pattern from the ECU 3.

When the charging command value is inputted, in a state the discharging switch is turned off, the chopper control by repetition of ON/OFF of the charging switch is performed after start of charging until the full charging voltage reaches the charging voltage value (V1) that is a value greater than the valve opening starting value (V0).

When it becomes the time t0 and the charging switch is turned on, the electric charge of the condenser is charged to the laminated piezoelectric element 5. At this time, the charging current supplied to the laminated piezoelectric element 5 increases. Also, when the peak value of the charging current exceeds the current threshold value 1, the charging switch is turned off.

When the charging switch is turned off, the energy of the charging/discharging coil is charged to the laminated piezoelectric element 5. At this time, the charging current supplied to the laminated piezoelectric element 5 reduces. Also, when the charging current becomes 0, the charging switch is turned on.

Such ON/OFF of the charging switch is performed from the time t0 until the time ta, namely until passing the first timing (tm). Thus, in the first half of the charging period (Tm1+Tm2), because a larger current is supplied to the laminated piezoelectric element 5 compared to the second charging control pattern, the increasing rate of the charging voltage of the laminated piezoelectric element 5 becomes faster compared to the second charging control pattern. As a result, the second timing (tm) comes earlier than the first timing (tp) of the time of the pilot injection.

During the period from the time ta to the time tb when the control valve 15 is fully lifted, the current threshold value for turning off the charging switch is switched to the current threshold value 2 that is smaller than the current threshold value 1. Also, when the charging voltage comes close to the full charging voltage value ($V_{full}$), namely during the period from the time tb to the time tc, the current threshold value for turning off the charging switch is switched to the current threshold value 3 that is smaller than the current threshold value 2. Thus, in the latter half of the charging period, because a larger current is supplied to the laminated piezoelectric element 5 compared to the second charging control pattern, the increasing rate of the charging voltage of the laminated piezoelectric element 5 becomes slower compared to the second charging control pattern, and overshooting of the charging voltage at the time of finish of the charging period can be prevented.

In the meantime, when the control valve 15 opens (is fully lifted), the low pressure port is opened, and the high pressure port is closed.

Thus, the fuel inside the control chamber 18 flows out to the low pressure side of the fuel system through the common flow path 17, the valve storing chamber 14, the out orifice 19, the low pressure fuel path 20, and the like. Thus, when the fuel pressure inside the control chamber 18 (control chamber pressure) quickly drops and becomes equal to or below the needle valve opening starting pressure (P0), the needle 8 departs (lifts) from the seat surface. Thus, the needle 8 opens, and fuel injection into the cylinder of the engine is started.

Also, when the judgment result of step S4 is NO, the drive current control value for the minute injection other than that of the main injection is read so as to select the other second charging control pattern out of the charging control patterns with respect to the laminated piezoelectric element 5 and to perform charging control of the laminated piezoelectric element 5 according to this second charging control pattern selected (step S8).

Next, energization of the laminated piezoelectric element 5 is controlled, and charging control of the laminated piezoelectric element 5 is performed according to the second charging control pattern (step S9). Thereafter, the processing of step S7 is performed.

Here, the charging control at the time of fuel injection with a minute injection quantity (pilot injection) will be explained based on the timing chart of FIG. 6.

At the same time the EDU 4 inputs the valve opening drive command (injection command value ON) from the ECU 3, the EDU 4 inputs the charging command value based on the second charging control pattern from the ECU 3.

When the charging command value is inputted, in a state the discharging switch is turned off, the chopper control by repetition of ON/OFF of the charging switch is performed after start of charging until the charging voltage reaches the full charging voltage value (V1) that is a value greater than the valve opening starting value (V0).

When it becomes the time t0 and the charging switch is turned on, the electric charge of the condenser is charged to the laminated piezoelectric element 5. At this time, the charging current supplied to the laminated piezoelectric element 5 increases. Also, when the peak value of the charging current exceeds the current threshold value 1, the charging switch is turned off.

When the charging switch is turned off, the energy of the charging/discharging coil is charged to the laminated piezoelectric element 5. At this time, the charging current supplied to the laminated piezoelectric element 5 reduces. Also, when the charging current becomes 0, the charging switch is turned on. Such ON/OFF of the charging switch is performed from the time t0 until the time ta.

Further, during the period from the time ta to the time tb, the current threshold value for turning off the charging switch is switched to the current threshold value 2 greater than the current threshold value 1.

Such ON/OFF of the charging switch is performed until passing the second timing (tp). Thus, in the first half of the charging period, because a smaller current is supplied to the laminated piezoelectric element 5 compared to the first charging control pattern, the increasing rate of the charging voltage of the laminated piezoelectric element 5 becomes slower compared to the first charging control pattern. As a result, the second timing (tp) comes later than the first timing (tm) of the time of the main injection.

If the time when the control valve 15 is fully lifted passes and it becomes the time tb, the current threshold value for turning off the charging switch is switched to the current threshold value 3 that is smaller than the current threshold values 1 and 2. Thus, in the latter half of the charging period, because a larger current is supplied to the laminated piezoelectric element 5 compared to the first charging control pattern, the increasing rate of the charging voltage of the laminated piezoelectric element 5 becomes faster compared to the first charging control pattern. Also, when the charging voltage comes close to the full charging voltage value ($V_{full}$), namely during the period from the time tb to the time tc, the current threshold value for turning off the charging switch is switched to the current threshold value 3 that is smaller than the current threshold value 2. Thus, overshooting of the charging voltage at the time of finish of the charging period can be prevented.

In the meantime, when the control valve 15 opens (is fully lifted), the low pressure port is opened, and the high pressure port is closed.

Thus, the fuel inside the control chamber 18 flows out to the low pressure side of the fuel system through the common flow path 17, the valve storing chamber 14, the out orifice 19, the low pressure fuel path 20, and the like. Thus, when the fuel pressure inside the control chamber 18 (control chamber pressure) quickly drops and becomes equal to or below the needle valve opening starting pressure (P0), the needle 8 departs (lifts) from the seat surface. Thus, the needle 8 opens, and fuel injection into the cylinder of the engine is started.

[Advantage of First Embodiment]

Here, a highly responsive injector with expanded aperture diameter of the out orifice and increased discharging flow rate (comparative example) has the merits such as improvement of the degree of constant volume by improvement of the degree of closeness to a rectangle of the injection rate (fuel economy improvement), and fuel economy improvement and reduction of the engine noise and the exhaust emission by shortening the interval between injections (achievement of close multi-stage injection).

However, in the injector with high valve opening responsiveness (comparative example), the valve opening timing of the needle 8 becomes earlier compared to the injector with slow valve opening responsiveness (example of a prior art, comparative example) as shown in a broken line in FIG. 6 and FIG. 7, and therefore the injection quantity of the fuel (actual measurement value) increases. Further, because the lowering rate of the fuel pressure inside the control chamber 18 also becomes faster compared to the injector with slow valve opening responsiveness (example of a prior art, comparative example), the lifting amount of the needle 8 increases. Thus, because the annular clearance between the valve part of the needle 8 and the seat surface of the housing 6 increases and the fuel amount flowing from the fuel reservoir chamber 22 to the plural injection holes 7 side through the annular clearance increases, the injection quantity of the fuel (actual measurement value) increases.

Therefore, the injection rate waveform (example of a prior art, comparative example) shown in the broken line in FIG. 6 becomes large compared to the injection rate waveform (embodiment) shown in the solid line. Thus, because the injection quantity is increased compared to the injector with slow valve opening responsiveness (example of a prior art, comparative example), the injection command value (Tqp) becomes short to less than or equal to the charging period (Tp1+Tp2).

Therefore, according to the control device 2 that controls the injector 1 of the present embodiment, when the main injection is performed, as the valve opening starting timing when the charging voltage to the laminated piezoelectric element 5 reaches the valve opening starting value (V0), the first timing (tm) is set.

On the other hand, when the pilot injection is performed, as the valve opening starting timing described above, the second timing (tp) is set.

Here, the second timing (tp) is set to the timing of the time later than the first timing (tm), namely tp>tm.

Thus, when the pilot injection is performed, namely when the fuel injection by a minute injection quantity with the target injection quantity (calculation value: Q) of less than or equal to a predetermined value is performed, as the valve opening starting timing described above, the second timing (tp) of the time later than the first timing (tm) is selected.

Therefore, in the control period after start of charging to the laminated piezoelectric element 5 until the valve opening starting value (V0) of the charging voltage, the laminated piezoelectric element 5 comes to be charged with a loose energizing condition, namely with a less charging current. Thus, because the valve opening starting timing of the control valve 15 of the injector 1 can be delayed, the actual injection quantity can be reduced by that portion compared to the injector with high valve opening responsiveness (comparative example).

Therefore, because the injection quantity of the fuel (actual measurement value) can be reduced even when the injection command value (command value of injection period: Tqp) at the time of the pilot injection, for example, is not made less than or equal to the charging period (Tp1+Tp2), as shown in FIGS. 4A and 4B, the timing of charging start determined by the injection command value can be made the timing when the charging amount reaches the full charging voltage value (V1) onward, namely the charging period onward. As a result, in the injector 1 with increased valve opening responsiveness, the valve opening behavior of the control valve 15 of the injector 1 in the fuel injection with a minute injection quantity can be stabilized without replacing the control device 2, particularly the EDU 4 with that of a large current specification.

Also, in the present embodiment, as shown in FIGS. 4A and 4B, the injection command value (Tqp) at the time of the pilot injection is set to the charging period (Tp1+Tp2) and onward. Further, the pilot injection timing (Tp) may be set to the charging finishing reaching timing ($t_{full}$=tc) and onward.

On the other hand, when the main injection is performed, namely when the fuel injection by a large injection quantity is performed in which the target injection quantity (Q) is greater than a predetermined value, as the valve opening starting timing described above, the first timing (tm) of the time earlier than the second timing (tp) is selected.

Therefore, the energizing condition can be set within a range of the capacity of the EDU 4 of the present state, for example. Thus, the effect obtained by improving the valve opening responsiveness can be enjoyed at the maximum within the range of the capacity of the EDU 4 of the present state, for example.

Therefore, according to the control device 2 that controls the injector 1 of the present embodiment, when the fuel injection by a minute injection quantity is performed in which the target injection quantity (Q) is less than or equal to a predetermined value, priority can be given to stabilization of the valve opening behavior of the control valve 15 of the injector 1, whereas when the fuel injection by a large injection quantity is performed in which the target injection quantity (Q) is greater than a predetermined amount, priority can be given to secure the effect obtained by improving the valve opening responsiveness. In other words, both of the valve opening responsiveness and the minute injection quantity controllability of the injector 1 can be achieved.

Also, the pilot injection quantity can be reduced without impairing the valve opening responsiveness of the main injection (maintenance of the interval between injections, the degree of closeness to a rectangle of the injection rate). Further, in the fuel injection by minute injection such as the pilot injection, the injection quantity lower limit value (minimum injection quantity) controllable can be lowered.

[Second Embodiment]

Figure 9:
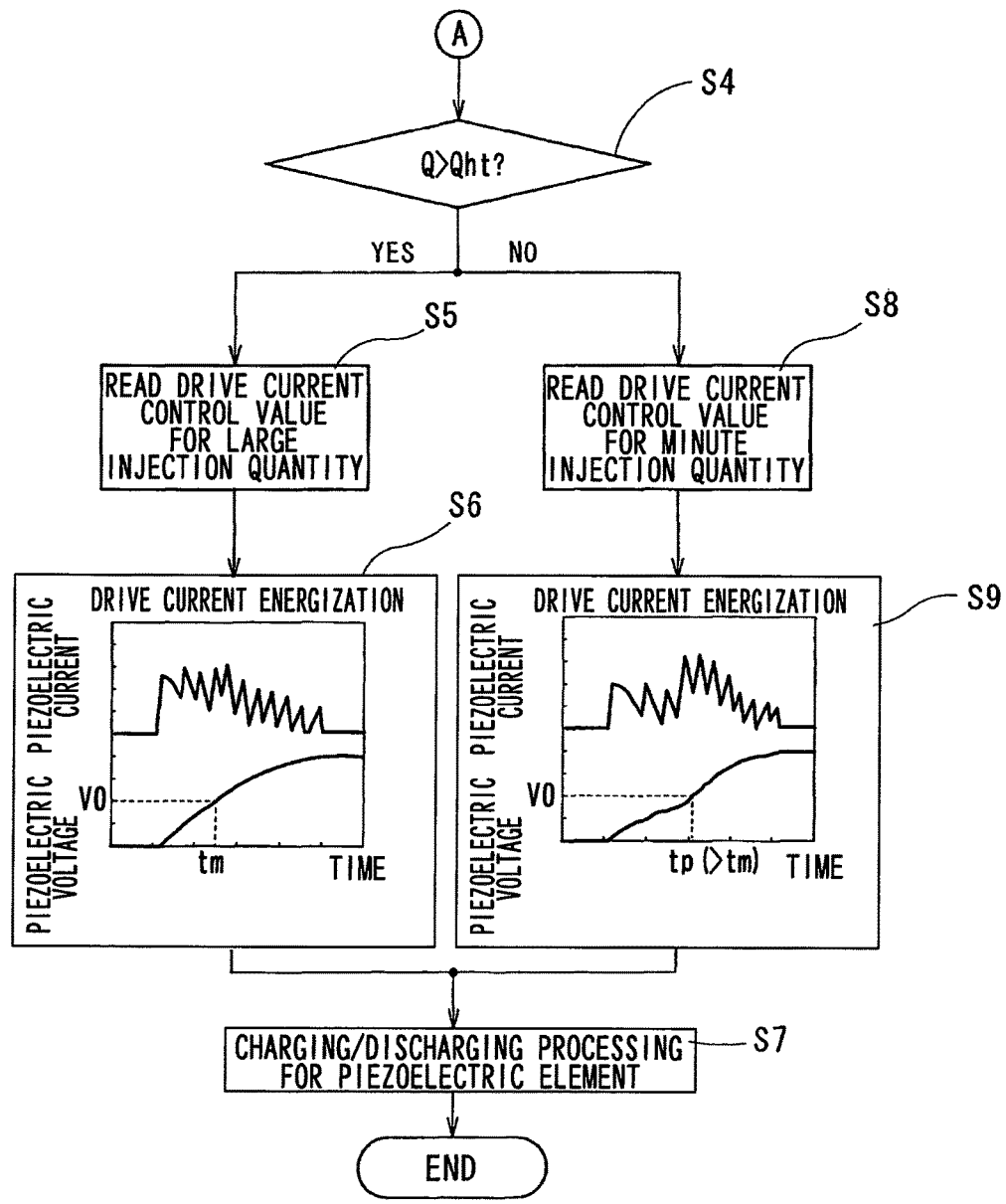
FIG. 9 is a flowchart showing a charging control method for a layered piezoelectric element according to a second embodiment.

FIG. 9 shows a fuel injection device to which the present disclosure is applied.

Here, the reference sign same as that of the first embodiment shows the same configuration or function, and explanation thereof will be omitted.

The control device 2 of the present embodiment corresponds to the injection quantity determining section, a determining section, and a setting section. This control device 2 includes the determining section (step S4 of FIG. 9) that determines whether or not the target injection quantity (Q) in each injection of the split injection is greater than a predetermined value (pilot injection quantity: Qp).

Thus, when the fuel injection by a large injection quantity is performed in which the target injection quantity (Q) is greater than the pilot injection quantity (Qp), as the valve opening starting timing described above, the first timing (tm) of the time earlier than the second timing (tp) is selected. Also, as the control period described above, the first period (Tm1) of the time shorter than the second period (Tp1) is selected, Alternatively, as the charging increasing rate described above, the first charging rate (Vm) which is a faster rate than the second charging rate (Vp) is selected.

Also, when the fuel injection by a minute injection quantity is performed in which the target injection quantity (Q) is less than or equal to the pilot injection quantity (Qp), as the valve opening starting timing described above, the second timing (tp) of the time later than the first timing (tm) is selected. Also, as the control period described above, the second period (Tp1) of the time longer than the first period (Tm1) is selected. Alternatively, as the charging increasing rate described above, the second charging rate (Vp) which is a slower rate than the first charging rate (Vm) is selected.

Further, in the case of the charging control of the present embodiment also, the charging finishing reaching timing ($t_{full}$=t1) and the full charging voltage value ($V_{full}$=V1) are constant regardless of the target injection quantity (Q) from the reason described above.

As described above, in the control device 2 of the present embodiment, the effect similar to that of the first embodiment is exerted.

Also, similarly to the first embodiment, the ROM of the EDU 4 stores the first and second charging control maps shown in FIG. 9 by plural numbers for every different common rail pressure (combustion pressure).

[Third Embodiment]

Figure 10:
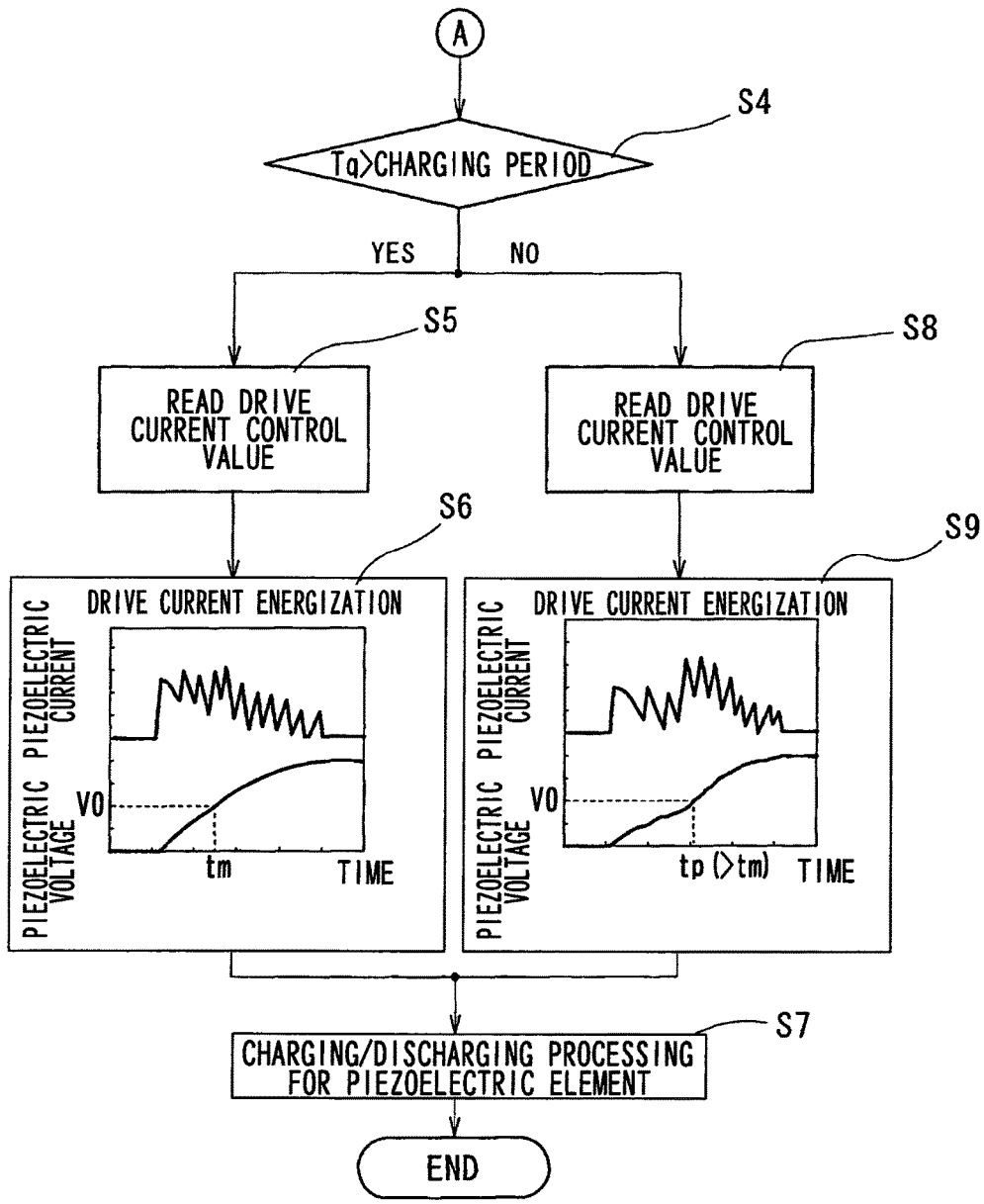
FIG. 10 is a flowchart showing a charging control method for a layered piezoelectric element according to a third embodiment.

FIG. 10 shows a fuel injection device to which the present disclosure is applied.

Here, the reference sign same as that of the first and second embodiments shows the same configuration or function, and explanation thereof will be omitted.

The control device 2 of the present embodiment corresponds to the injection quantity determining section, the determining section, and the setting section. This control device 2 includes the determining section (step S4 of FIG. 10) that determines whether or not the injection command value (Tq) corresponding to the target injection quantity (Q) in each injection of the split injection is greater than the predetermined value (charging period).

Thus, when the fuel injection by a large injection quantity is performed in which the injection command value (Tq) is greater than the predetermined value (charging period), as the valve opening starting timing described above, the first timing (tm) of the time earlier than the second timing (tp) is selected. Also, as the control period described above, the first period (Tm1) of the time shorter than the second period (Tp1) is selected. Alternatively, as the charging increasing rate described above, the first charging rate (Vm) which is a faster rate than the second charging rate (Vp) is selected.

Also, when the fuel injection by a minute injection quantity is performed in which the injection command value (Tq) is less than or equal to the predetermined value (charging period), as the valve opening starting timing described above, the second timing (tp) of the time later than the first timing (tm) is selected. Also, as the control period described above, the second period (Tp1) of the time longer than the first period (Tm1) is selected. Alternatively, as the charging increasing rate described above, the second charging rate (Vp) which is a slower rate than the first charging rate (Vm) is selected.

Further, in the case of the charging control of the present embodiment also, the charging finishing reaching timing ($t_{full}$=t1) and the full charging voltage value ($V_{full}$=V1) are constant regardless of the target injection quantity (Q) or the injection command value (Tq) from the reason described above.

As described above, in the control device 2 of the present embodiment, the effect similar to that of the first and second embodiments is exerted.

Also, similarly to the first and second embodiments, the ROM of the EDU 4 stores the first and second charging control maps shown in FIG. 10 by plural numbers for every different common rail pressure (combustion pressure).

[Fourth Embodiment]

Figure 11:
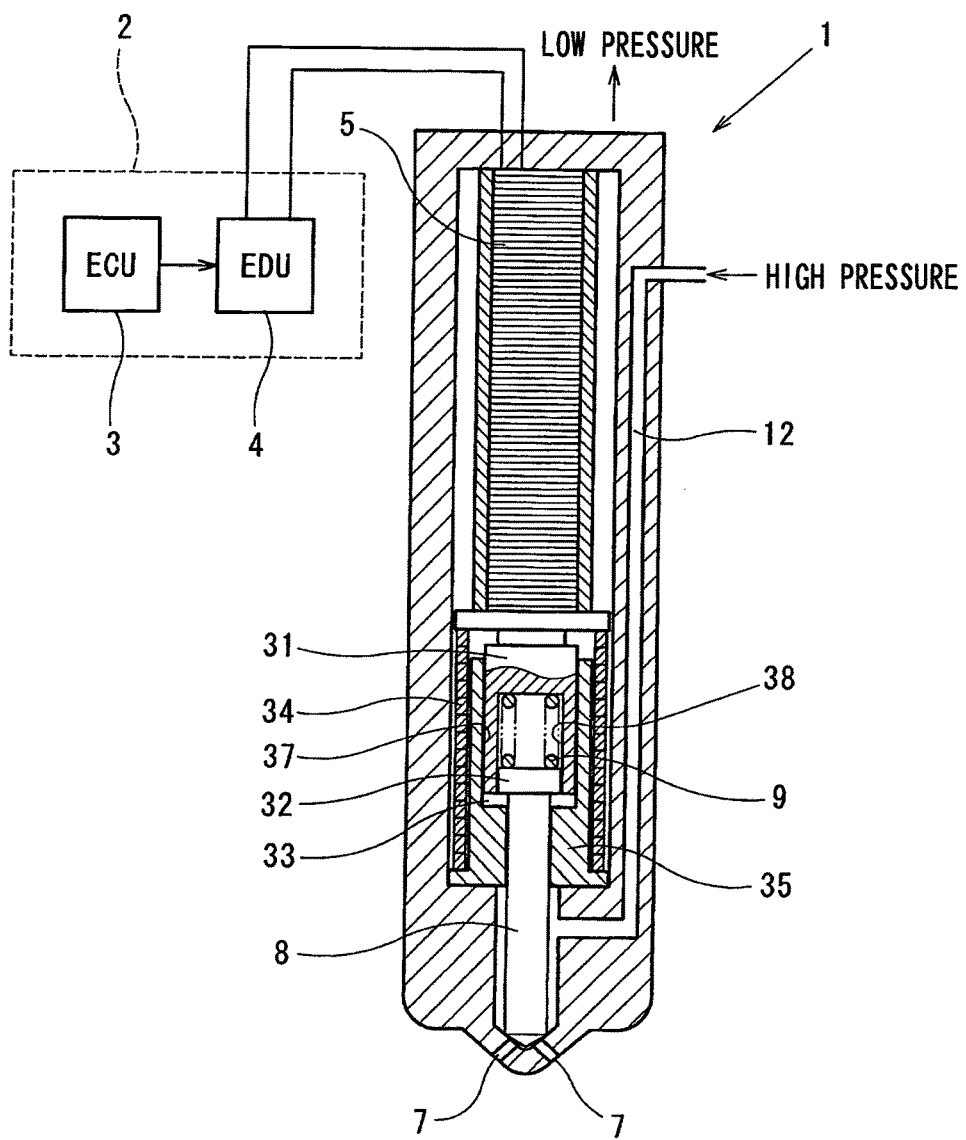
FIG. 11 is a configuration drawing showing a schematic configuration of a fuel injection device according to a fourth embodiment.

FIG. 11 shows a fuel injection device of the internal combustion engine to which the present disclosure is applied.

Here, the reference sign same as that of the first to third embodiments shows the same configuration or function, and explanation thereof will be omitted.

The injector 1 of the present embodiment is a direct acting type fuel injector that directly drives to open/close the needle 8 by the actuator. This injector 1 includes the actuator having the laminated piezoelectric element 5 and the displacement expanding mechanism, the housing 6 having the injection holes 7 that communicate with the combustion chamber of the cylinder of the engine, and the needle 8 that opens/closes the injection holes 7 of the housing 6.

Inside the housing 6, the high pressure fuel path 12 is formed which supplies the high pressure fuel from the inlet port to the plural injection holes 7 through the fuel reservoir chamber 22.

The needle 8 corresponds to the valve body of the fuel injector. In the end on the opposite side of the injection hole in the axial direction of this needle 8, the sliding section (the valve piston 32 of the displacement expanding mechanism) is arranged.

The valve piston 32 is reciprocally and slidably supported by the wall surface of the storing recess (spring storing chamber 31) that is formed in the piezoelectric piston 31 of the displacement expanding mechanism. Inside this spring storing chamber 31, the nozzle spring 9 that energizes the needle 8 in the valve closing direction is stored. Also, the needle 8 is reciprocally and slidably supported by the hole wall surface of a sliding hole 37 of the piston cylinder 35 of the displacement expanding mechanism.

The actuator includes the laminated piezoelectric element 5 and the displacement expanding mechanism.

The displacement expanding mechanism includes the piezoelectric piston 31, the valve piston 32, the piezoelectric spring 34, and the piston cylinder 35. This displacement expanding mechanism includes a reversing mechanism that reverses the displacing direction of the needle 8 and the valve piston 32 with respect to the displacing direction of the laminated piezoelectric element 5 and the piezoelectric piston 31.

The piezoelectric piston 31 is reciprocally and slidably supported by the wall surface of the storing recess 38 that is formed in the piston cylinder 35.

The displacement expanding mechanism includes the oil tight chamber 33 that is formed between the annular end surface on the injection hole side of the piezoelectric piston 31 and the bottom surface of the storing recess 38 of the piston cylinder 35. Inside this oil tight chamber 33, the working oil (fuel) is filled.

The displacement expanding mechanism is configured to expand the displacement of the laminated piezoelectric element 5 and the piezoelectric piston 31 by increase of the oil hydraulic pressure inside the oil tight chamber 33 by extension displacement of the laminated piezoelectric element 5, to transmit the displacement to the valve piston 32, and to drive to open the needle 8.

In the injector 1, when the oil hydraulic pressure inside the oil tight chamber 33 rises to equal to or greater than a predetermined value by extension displacement of the laminated piezoelectric element 5, the needle 8 departs from the seat (opens) resisting the energizing force of the nozzle spring 9, and the high pressure fuel is injected into the combustion chamber of the cylinder of the engine.

Also, in the injector 1, when the oil hydraulic pressure inside the oil tight chamber 33 drops by shrinking displacement of the laminated piezoelectric element 5, the needle 8 sits on the seat (closes) by the energizing force of the nozzle spring 9, and the fuel injection into the combustion chamber of the cylinder of the engine finishes.

As described above, in the control device 2 of the present embodiment, the effect similar to that of the first to third embodiments is exerted.

Also, as the charging method for the laminated piezoelectric element 5 of the present embodiment, any of the control routine of FIG. 2, FIG. 3, FIG. 9, and FIG. 10 is used.

[Modifications]

Although the charging voltage of the laminated piezoelectric element 5 is used to express the charging amount to the laminated piezoelectric element 5 in the present embodiment, the charging energy obtained by time integration of the charging current of the laminated piezoelectric element 5 multiplied by the charging voltage may also be used to express the charging amount to the laminated piezoelectric element 5.

Although charging is controlled so that the increasing rate of the charging voltage changes, with the valve opening starting value (V0) being the inflection point in the present embodiment, it is also possible that at least one or more inflection points are arranged other than the valve opening starting value (V0), and charging is controlled so that the increasing rate of the charging voltage changes with the inflection points as the boundaries. Further, it is also possible to arrange the valve opening starting value (V0) and at least one or more inflection points other than it.

Although the increasing rate of the charging voltage is controlled by adjusting the value of the charging current supplied to the laminated piezoelectric element 5 based on the current threshold value in the present embodiment, it is also possible to control the increasing rate of the charging voltage by adjusting the value of the charging current supplied to the laminated piezoelectric element 5 by ON/OFF control based on the duty ratio by the charging command value shown in FIG. 5, for example.

Although the case where the present disclosure is applied to the charging control of the case of the main injection and the pilot injection is explained in the present embodiment, the present disclosure may also be applied to the charging control of the case of the pre-injection, after-injection, or post-injection as the minute injection other than the main injection.

Also, in the setting section, when the injection quantity is a minute injection quantity, it is possible to set the second period longer compared to the case of much injection quantity as the injection quantity is smaller.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A fuel injection device, comprising:
   a fuel injector that includes a laminated piezoelectric element expanding/shrinking by charging/discharging an electric charge and a valve body driven to open/close according to the expanding/shrinking displacement of the laminated piezoelectric element, and performs a fuel injection to a cylinder of an internal combustion engine; and
   a control device that controls the fuel injection of the fuel injector by performing charging/discharging control of the laminated piezoelectric element, wherein
   the control device sets a final target value with respect to a charging amount of the laminated piezoelectric element to a value greater than a valve opening starting value that is a charging amount of the laminated piezoelectric element required for the valve body to start a valve opening and stores the final target value in computer memory, and the final target value is a voltage value;
   the fuel injection is continued while maintaining the charging amount at the final target value after the charging amount exceeds the valve opening starting value after start of charging to the laminated piezoelectric element and reaches the final target value,
   the control device includes:
   an injection quantity determining section that sets a command value of the injection quantity corresponding to the injection quantity of the fuel during one valve opening period of the fuel injector, the command value being stored in the computer memory;
   a determining section that determines whether or not the command value of the injection quantity set by the injection quantity determining section is greater than a predetermined value; and
   a setting section that sets a first timing as the valve opening starting timing when the charging amount reaches the valve opening starting value in a case where the command value of the injection quantity is determined to be greater than the predetermined value, and sets a second timing that is later than the first timing as the valve opening starting timing in a case where the command value of the injection quantity is determined to be less than or equal to the predetermined value, wherein
   in a case where the command value of the injection quantity is determined to be greater than the predetermined value, an upper current threshold value of a charging current supplied to the laminated piezoelectric element is stepwisely decreased after the charging amount reaches the valve opening starting value, and
   in a case where the command value of the injection quantity is determined to be less than or equal to the predetermined value, the upper current threshold value of the charging current supplied to the laminated piezoelectric element is stepwisely increased before the charging amount reaches the value opening starting value, and then stepwisely decreased after the charging amount reaches the value opening starting value.

2. The fuel injection device according to claim 1, wherein the setting section includes a period setting section that sets a first period as the control period after a starting of charging to the laminated piezoelectric element until reaching the valve opening starting value in a case where the command value of the injection quantity is determined to be greater than the predetermined value, and sets a second period that is longer than the first period as the control period in a case where the command value of the injection quantity is determined to be less than or equal to the predetermined value.

3. The fuel injection device according to claim 1, wherein the setting section includes a rate setting section that sets a first charging rate as the charging rate after a starting of charging to the laminated piezoelectric element until reaching the valve opening starting value in a case where the command value of the injection quantity is determined to be greater than the predetermined value, and sets a second charging rate that is slower than the first charging rate as the charging rate in a case where the command value of the injection quantity is determined to be less than or equal to the predetermined value.

4. The fuel injection device according to claim 1, wherein the control device includes an injection control section that performs a split injection of performing multiple fuel injections from the fuel injector to the cylinder of the internal combustion engine in one combustion cycle, and
the injection quantity determining section sets a command value of the injection quantity corresponding to the injection quantity of the fuel in each injection of the multiple fuel injections.

5. The fuel injection device according to claim 4, wherein the injection control section performs a minute injection other than a main injection at least prior to the main injection during one combustion cycle of the internal combustion engine.

6. The fuel injection device according to claim 5, wherein the case where the command value of the injection quantity is determined to be greater than the predetermined value represents a case where the fuel injection of a large injection quantity or the main injection is selected, and the case where the command value of the injection quantity is determined to be less than or equal to the predetermined value represents a case where the fuel injection of a minute injection quantity or a pilot injection is selected.

7. The fuel injection device according to claim 1, wherein the control device includes a creation section that creates a plurality of charging control patterns for the laminated piezoelectric element based on a control period, and a charging control section that performs charging control of the laminated piezoelectric element based on the plurality of charging control patterns created by the creation section.

8. The fuel injection device according to claim 7, wherein the creation section creates a first charging control pattern in which the control period is set to the first period, and a second charging control pattern in which the control period is set to the second period.

9. The fuel injection device according to claim 8, wherein in the first charging control pattern and the second charging control pattern, a charging finishing timing of reaching the final target value or a charging amount at the charging finishing timing is the same in each of the control patterns.

10. The fuel injection device according to claim 1, wherein the control device includes a control circuit that supplies a charging current to the laminated piezoelectric element.

* * * * *